United States Patent [19]

Buffa

[11] 4,278,312

[45] Jul. 14, 1981

[54] SAFETY PLUG FOR ARC WELDER CONNECTORS

[76] Inventor: Albert L. Buffa, 121 La Canada, Goodyear, Ariz. 85338

[21] Appl. No.: 93,067

[22] Filed: Nov. 13, 1979

[51] Int. Cl.³ .............................................. H01R 3/00
[52] U.S. Cl. .................................... 339/38; 339/88 R
[58] Field of Search .................. 279/76; 403/253, 254, 403/348; 339/38, 47 R, 88 R, 188 R, 188 C, 181 R, 181 C, 187

[56] References Cited

U.S. PATENT DOCUMENTS

| | | | |
|---|---|---|---|
| 794,140 | 7/1905 | Costa | 339/38 |
| 2,101,345 | 12/1937 | Riley | 339/38 |
| 2,365,425 | 12/1944 | Miller | 279/76 |
| 4,105,273 | 8/1978 | Henschke et al. | 339/88 R |

FOREIGN PATENT DOCUMENTS

| | | | |
|---|---|---|---|
| 2023188 | 11/1970 | Fed. Rep. of Germany | 339/47 R |
| 208056 | 12/1939 | Switzerland | 339/38 |

*Primary Examiner*—John McQuade
*Attorney, Agent, or Firm*—Cahill, Sutton and Thomas

[57] ABSTRACT

A safety plug for insertion into a female electrical connector of an arc welder includes an electrically insulating slotted male member which can be inserted and locked into a receptacle of the female electrical connector to avoid shorting of an exposed brass core of the female connector when a user disconnects a welding stick from the female connector and drops the female connector to the floor.

3 Claims, 7 Drawing Figures

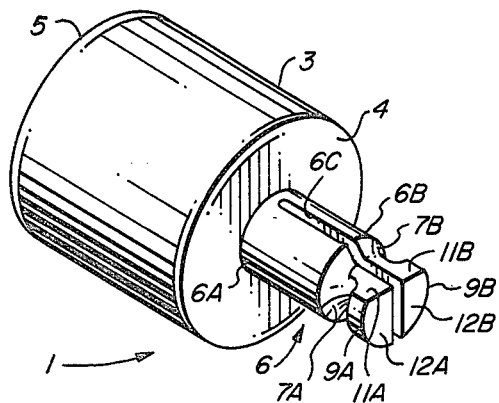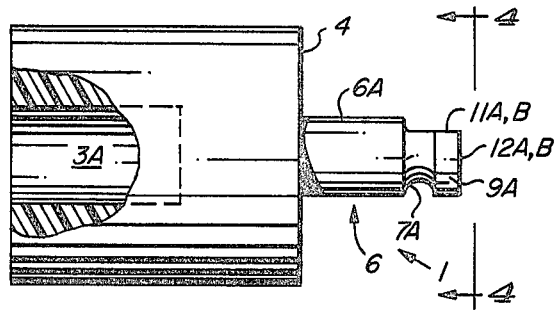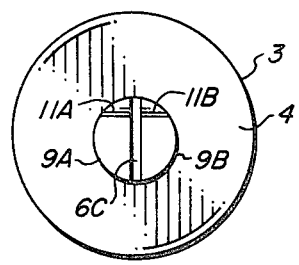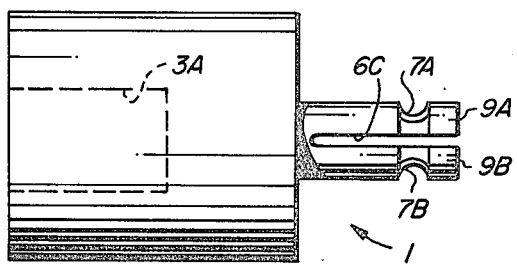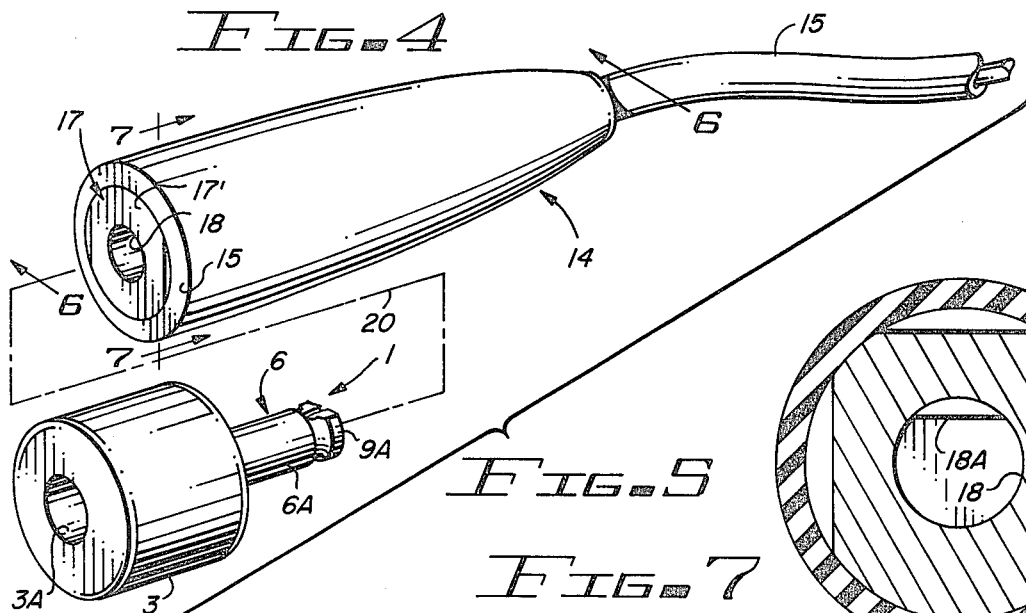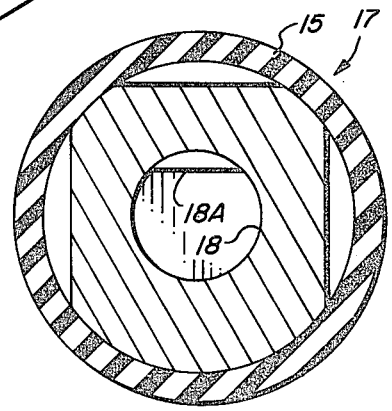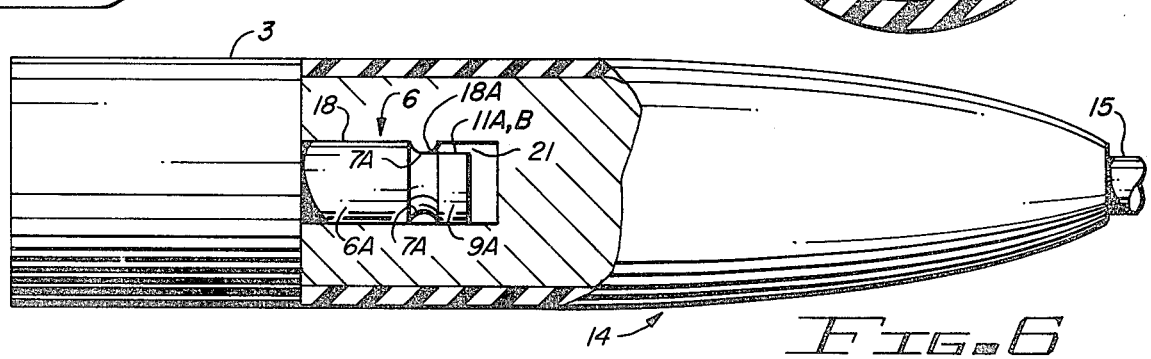

SAFETY PLUG FOR ARC WELDER CONNECTORS

BACKGROUND OF THE INVENTION

1. Field of the Invention

The invention relates to insulating safety plugs for insertion into receptacles of locking female electrical connectors of arc welders.

2. Description of the Prior Art

Arc welding machines supply very high DC currents to welding "sticks" which are rididly gripped by means of hand-held clamping devices. The welding sticks and the clamping devices are electrically conductive. A clamping device is coupled to a female electrical connector by means of a male electrical connector inserted into the female electrical connector. The female electrical connector, which is manufactured by Tweco Products, Inc., is connected to an arc welder by means of a heavy, well insulated single conductor cable. The female connector includes a heavy brass core covered with heavy rubber insulation. The brass core has one end connected to the conductor of the cable within the rubber insulation, the other end of the brass core being exposed. The exposed end of the brass core is circular, and lies in a plane perpendicular to a cylindrical axis of the brass core. The exposed end of the brass core of the female connector is recessed only slightly from the edge of the heavy rubber insulator encasing the brass core. A cylindrical hole for receiving a cylindrical conductive prong of the male connector is disposed concentrically along the cylindrical axis into the exposed end of the base core. A ridge is disposed deep in the cylindrical hole, forming a chord member extending between two portions of the wall of the cylindrical hole.

The conductive prong of the male connector includes a cylindrical shaft having a circumferential groove disposed around the shaft adjacent a tip portion of the shaft of the prong. The tip portion of the shaft extending beyond the circumferential groove includes a "cutaway portion" having a flat surface parallel to an axis of the conductive prong and extending from the bottom of an adjacent portion of the circumferential groove to the outer end of the tip portion of the shaft. The flat surface passes by the chord member as the conductive prong is inserted into the cylindrical hole so that the chord member is essentially aligned with the circumferential groove when the shaft of the male connector is inserted as far as possible into the female connector. The male and female connectors are then twisted in opposite directions, causing the chord member to pass into the circumferential groove, thereby tightly engaging the shaft of the male connector. This results in a very low resistance electrical connection from the base core of the female connector to the shaft of the male connector, which is connected to the welding stick by means of the clamping device. The low resistance electrical connection is essential (because of very high currents generated by the arc welder) to avoid overheating of the male and female electrical connectors and also to avoid voltage drops across them.

In order to obtain the low resistance electrical contact between the male and female electrical connectors, and to attain precise, reliable locking action as described above, it is necessary that the above described cylindrical hole in the brass core of the female connector be precisely matched to the cylindrical shaft of the male connector.

In use, welders wear electrically insulated gloves when using an arc welder. The voltage produced by the arc welding machine is applied via the above described cable, female connector and male connector to the welding stick. The remote tip of the welding stick is touched to a metal object to be welded, the metal object being electrically grounded. A very high current then flows from the tip of the welding stick. The temperature of the tip of the welding stick rapidly rises to its melting point, as does the metal portion of the metal object touched by the tip of the welding stick. Welding is thus achieved by fusing of the melted metal of the welding stick and the object being touched by the welding stick.

When a welder has completed a welding task, he must, of course, disconnect the welding stick from the high voltage to which it is connected (by means of the male connector) before he sets the welding stick and clamp down to avoid shorting of the clamp and/or welding stick to any electrically grounded object that may be in the vicinity. He does this by twisting the male and female connectors, essentially as described above, to allow the cutaway portion of the shaft of the male connector to slip under the chord member, unlocking the two connectors. He then separates the two connectors.

At this point, many, if not most welders, simply drop the female connector to the floor, often carelessly. Since the base core still has a high voltage thereon, if the female connector is dropped on or adjacent to any electrically grounded conductive object, the exposed end of the brass core will be shorted to ground. A very large current will flow through the part of the brass core touching the grounded object. This causes melting of material of the brass core, the formation of a "bead" of brass thereon. The bead then hardens. If the bead is located at the edge of the cylindrical hole in the base core, the precision prong or shaft of the male connector can no longer be inserted into the cylindrical hole of the female connector until the bead is filed off or otherwise removed. As a practical matter, the female connector, which costs roughly $6.00 to $7.00, is discarded and replaced by a new one.

Accordingly, it is an object of the invention to provide a means and method for avoiding shorting of the brass core of female electrical connectors of arc welders when the female connectors are disconnected from male connectors

SUMMARY OF THE INVENTION

Briefly described, and in accordance with one embodiment thereof, the invention provides an insulating safety plug including a cylindrical shaft member for insertion into a female electrical connector coupled to an arc welding machine. In the described embodiment of the invention the cylindrical shaft extends from an enlarged cylindrical body and is concentric therewith. A circumferential groove is disposed adjacent a tip portion of the cylindrical shaft. A cutaway portion of the end tip of the shaft is bounded by a plane parallel to the cylindrical axis of the shaft and passing through the bottom of the circumferential groove. The extreme end of the shaft is bounded by a plane which is perpendicular to the cylindrical axis of the shaft. The cylindrical shaft is bisected by a slot, the sides of which lie in planes perpendicular to the plane bounding the cutaway portion of the end tip. The safety plug is composed of durable electrically insulating material. The safety plug is utilized by inserting the cylindrical shaft into a cylindrical hole of a female electrical connector of an arc welding machine. The cutaway portion of the end tip allows the shaft to pass by a chord member in the cylindrical hole of the female connector. After the cylincrical shaft has been completely inserted into the cylindrical hole, the cylindrical shaft is twisted with respect to the female connector, causing a chord member in the cylindrical hole to engage the circumferential groove. A cylindrical hole is disposed in the end of the safety plug device opposite to the end from which the cylindrical shaft extends for receiving the cylindrical shaft of another safety plug. This enables a plurality of safety plugs to be compactly engaged for shipment.

BRIEF DESCRIPTION OF THE DRAWINGS

FIG. 1 is a perspective view of the safety plug of the present invention.

FIG. 2 is a side view of the safety plug of FIG. 1.

FIG. 3 is a side view of the safety plug of FIG. 1 rotated 90 degrees clockwise from the side view of FIG. 2.

FIG. 4 is a section view taken along section lines 4—4 of FIG. 2.

FIG. 5 is a perspective view illustrating the safety plug of the present invention and the female connector into which the safety plug is inserted.

FIG. 6 is a partial cutaway side view showing the safety plug inserted into the female electrical connector of FIG. 5.

FIG. 7 is a section view taken along section lines 7—7 of FIG. 5.

DESCRIPTION OF THE INVENTION

Referring now to FIGS. 1-4, safety plug 1 includes a cylindrical body 3 having a first end 4 and a second end 5. Ends 4 and 5 are circular and are perpendicular to the cylindrical wall of cylindrical body 3. A cylindrical male member or shaft 6 having a diameter substantially less than the diameter of cylindrical body 3 extends concentrically outward from and perpendicular to end 4. Male member 6 is split by means of a slot 6C into half-sections 6A and 6B.

A continuous circumferential groove having a roughly semicircular cross-section extends around the male member 6 near the outermost end or tip portion thereof. The circumferential groove portion in half-section 6A is designated by reference numeral 7A, and the portion disposed in half-section 6B is designated by reference numeral 7B.

The extreme end of male member 6 is flat, and lies in a plane perpendicular to the cylindrical axis of male member 6. The portion of the extreme end of section 6 is designated by reference numeral 12A and the portion of extreme end of section 6B is designated by reference numeral 12B.

As clearly shown in FIG. 2, the extreme end of male member 6 includes a flat cutaway portion bounded by flat coplanar surfaces 11A and 11B. Cutaway surfaces 11A and 11B lie in a plane parallel to cylindrical axis of male member 6; that plane passes through the bottom of the circumferential groove 7A, 7B. The plane in which cutaway surfaces 11A and 11B lie is perpendicular to the walls of slot 6C.

A cylindrical hole 3A is formed in the end 5 of cylindrical body 3, as indicated by dotted lines 3A in FIGS. 2 and 3. Cylindrical hole 3A is coaxial with cylinder 3 and male member 6. Its diameter can be selected to snugly (but not tightly) receive the male member of another identical safety plug to facilitate compact packaging and shipping of a large number of the safety plugs.

The safety plug 1 described above is formed from a single block of nylon or other suitable electrically insulating plastic material. The diameter of cylindrical body 3 is approximately one and three-eights inches. The height of cylindrical body 3 is approximately one and one-half inches in length. The diameter of male member 6 is approximately five-eighths of an inch. The width of slot 6C is approximately one sixteenths of an inch.

Referring now to FIG. 5, cable 15 is a heavily insulated single-conductor cable extending from an arc welding machine (not shown). The near end of cable 15 is connected to a tapered end of female connector 14.

Female connector 14 inclues a conductive core 17 formed of brass. Brass core 17 is electrically connected to the electrical conductor of cable 15 within the heavy insulation around brass core 15. Brass core 17 has an exposed end 17'. Exposed end 17' is circular and lies in a plane perpendicular to the axis of brass core 17. A precision hole 18 is concentrically disposed in end 17' of brass core 17. Hole 18 performs the function of receiving a conductive male member of a male connector (not shown) which is electrically connected to the previously described welding stick. The prong of the male connector has substantially the same dimensions and configuration as male member 6 of safety plug 1. As previously explained, both hole 18 of female connector 14 and the prong of the male connector are formed with a high degree of precision so that the male member closely fits into hole 18.

Referring now to the section view of FIG. 7, hole 18 has a brass chord member 18A therein. Chord member 18A has a semicircular cross-sectional configuration which matches that of the previously described circumferential groove 7A, 7B, and is located substantially the same distance from the edge of hole 18 that the edge of circumferential groove 7A, 7B is located from end 4 of safety plug 1 (i.e., aproximately eleven-sixteenths of a inch from end 4). The radius of curvature of groove 7A, 7B and the corresponding radius of curvature of chord 18A are approximately three-thirty seconds of an inch.

It should be noted that the thickness of rubber insulation 15 of female connector 14 is approximately three-sixteenths of an inch.

Referring now to FIG. 6, male member 6 of safety plug 1 is shown inserted into hole 18. It is seen that semicircular groove 7A is perfectly aligned with chord member 18A of female connector 14. If the user then twists body 3 of safety plug 1 (either clockwise or counterclockwise) with respect to female connector 14, either ridge 9A or 9B on the end of male member 6 will pass into the vacant region designated by reference numeral 21 in FIG. 6, thereby locking safety plug 7A tightly into female member 14 in the same manner that conventional male connectors are locked into tight communication with female member 14 in order to produce the previously mentioned low resistance electrical connection.

Slot 6A permits sections 6A and 6B to be squeezed together slightly as shaft 6 is inserted into cylindrical hole 18, making the insertion easier if the diameter of shaft 6 is slightly too large.

Thus, it is seen that if the welder carelessly drops female connector 14 and the cable 15 connected thereto after locking protective plug 1 thereto in the manner mentioned previously, safety plug 1 will not become loosened, exposing end 17' of brass core 17. Consequently, it will be impossible for an electrical short to occur between exposed end 17' of brass core 17 and any electrically grounded object which happens to be lying nearby on the floor. Consequently, no deformation to or forming of beads on the opening edge of hole 18 can occur due to high currents produced by electrical shorting to the grounded object. The previously described inconvenience is thereby obviated.

While the invention has been described with reference to a particular embodiment thereof, those skilled in the art will be able to make obvious variations in the described embodiment of the invention without departing from the true spirit and scope thereof. For example, body 3 can be of a shape other than cylindrical. Further, cylindrical shaft 6 need not be insulative as long as body 3 is insulative.

I claim:

1. A safety device for preventing electrical shorting of a female connector of an arc welding machine, the female connector including
   i. a conductive core electrically connected to the arc welder by means of a flexible cable, the conductive core having an exposed end, a cylindrical hole for receiving a male connector being disposed in the exposed end of the conductive core, a chord member being disposed in the cylindrical hole a predetermined distance from the exposed end of the conductive core of the cylindrical hole,
   ii. a layer of electrically insulative material covering all of the conductive core except the exposed end, the electrically insulative material having an edge surface which is approximately coplanar with the exposed end of the female connector, said safety device comprising in combination:
   (a) a cylindrical shaft for insertion into the cylindrical hole of the conductive core, said cylindrical shaft having a main section;
   (b) a tip portion of said cylindrical shaft, said tip portion being separated from the main portion by a circumferential groove disposed in said shaft, said tip portion being bounded by a semicylindrical surface and by a first plane approximately parallel to a cylindrical axis of said cylindrical shaft, said first plane passing approximately through the bottom of said circumferential groove for allowing said tip portion to move past the chord member; and
   (c) an insulative body attached to said cylindrical shaft, said insulative body covering the exposed end of the female connector when said cylindrical shaft is inserted sufficiently far into said cylindrical hole that said circumferential groove is aligned with said chord member, said insulative body and said cylindrical shaft being integrally formed of a unitary piece of insulative material, the distance from said insulative body to an edge of said circumferential groove being substantially equal to said predetermined distance, a shaft receiving hole being disposed in an end of said insulative body opposite to the end thereof from which said cylindrical shaft extends, said shaft receiving hole being capable of receiving an entire cylindrical shaft of another safety device identical to said safety device to allow nesting of a plurality of said safety devices;

said safety device being rotatable with respect to the female connector to cause the chord member to engage said circumferential groove, locking the safety device to the female connector.

2. The safety device of claim 1 wherein said insulative body is cylindrical and coaxial with said cylindrical shaft.

3. The safety device of claim 1 wherein said cylindrical shaft is bisected by a slot bounded by surfaces perpendicular to said first plane.

* * * * *